United States Patent [19]

Vervloet et al.

[11] Patent Number: 4,908,286

[45] Date of Patent: * Mar. 13, 1990

[54] IMAGE-RECEIVING MATERIAL FOR USE IN DIFFUSION TRANSFER REVERSAL

[75] Inventors: Ludovicus H. Vervloet, Kessel; Willy P. De Smedt, Mechlin; Leon L. Vermeulen, Herenthout; Piet Kok, Ghent, all of Belgium

[73] Assignee: Agfa-Gevaert, N.V., Mortsel, Belgium

[ * ] Notice: The portion of the term of this patent subsequent to Aug. 9, 2005 has been disclaimed.

[21] Appl. No.: 348,122

[22] Filed: May 3, 1989

Related U.S. Application Data

[63] Continuation of Ser. No. 143,378, Jan. 13, 1988, abandoned.

[30] Foreign Application Priority Data

Jan. 16, 1987 [EP] European Pat. Off. ........ 87200059.1

[51] Int. Cl.⁴ .......................... G03C 5/54; G03C 1/76
[52] U.S. Cl. ........................................ 430/10; 430/14; 430/232; 430/233; 430/536; 430/628
[58] Field of Search ................ 430/232, 233, 231, 227, 430/534, 536, 204, 628, 10, 14

[56] References Cited

U.S. PATENT DOCUMENTS

| | | | |
|---|---|---|---|
| 3,214,274 | 10/1965 | Ohyama et al. | 430/536 |
| 3,397,989 | 8/1968 | Keberie et al. | 430/628 |
| 4,388,403 | 6/1983 | Helling et al. | 430/546 |
| 4,429,032 | 1/1984 | Matthe et al. | 430/231 |
| 4,762,759 | 8/1988 | Vermeulen et al. | 430/232 |

*Primary Examiner*—Richard L. Schilling
*Attorney, Agent, or Firm*—William J. Daniel

[57] ABSTRACT

Image-receiving material for use in diffusion transfer reversal processing comprising a polyvinyl chloride resin support coated with a hydrophilic waterpermeable layer comprising a proteinaceous colloid and a water-dispersible ionogenic polyester-polyurethane wherein isocyanate groups still present in its structure have reacted with an ionogenic compound containing at least one active hydrogen atom and a carboxylate or sulphonate salt group. This material is useful for the production of tamper proof laminates for identification purposes.

13 Claims, No Drawings

IMAGE-RECEIVING MATERIAL FOR USE IN DIFFUSION TRANSFER REVERSAL

This is a continuation of application Ser. No. 143,378, filed Jan. 13, 1988.

DESCRIPTION

The present invention relates to image-receiving materials with hydrobobic polyvinyl chloride support suitable for carrying out the silver complex diffusion transfer reversal (DTR) process and to laminar articles comprising a DTR image.

The principles of silver complex diffusion transfer reversal imaging are known e.g. from the book: "Photographic Silver Halide Diffusion Processes" by André Rott and Edith Weyde—Focal Press —London—New York (1972).

DTR-processing being by nature a wet processing yields prints that are still damp after the exposed and devloped photographic silver halide material has been separated from the image-receiving material containing developing nuclei in a hydrophilic binder. Known binding agents for a DTR-image-receiving material are polymeric hydrophilic substances swelling in water such as gelatin used alone or in combination with alginic acid derivatives, polyvinyl alcohol, starch and starch derivatives, particularly carboxymethylcellulose or gallactomannans (ref. the above mentioned book of André Rott and Edith Weyde, p. 49). Other organic binding agents of the synthetic type are e.g. poly-N-vinylpyrrolidinone, copolymers of polyvinyl ester and maleic anhydride. As inorganic binding agent colloidal silica has been mentioned, e.g. in U.S. Pat. No. 2,698,237.

The swelling properties of the image-receiving layer largely influence the speed of the DTR-image formation and image quality. In fact, if the layer swells too slowly, the entire DTR-process is retarded. Consequently, the silver is deposited from too small an amount of complexed silver halide and the density is too low resulting often in brown images. On the other hand, the image-receiving layer should not swell too strongly since image-sharpness will then be less and diffusion transfer and drying times too long. Moreover, due to too large a swelling too much processing liquid is left in the processed image-receiving material so that the white image parts on storage turn yellow or brown and the black image parts degrade and turn brown by transformation of image silver into silver sulphide.

As is generally known the addition of hardening agents decreases the swelling power of gelatin but normally this is accompanied by too strong a reduction in diffusion speed for the silver complexes whereby image quality in short processing times is affected.

Another problem arises when the image receiving layer has to be applied not to paper but on an hydrophobic resin surface whereto it has to adhere sufficiently in dry as well as in wet state.

Resin film base materials for use in silver halide photographic materials or silver complex DTR-receptor materials are inherently hydrophobic, whereas the usual gelatino-silver halide emulsion layers or colloid layers containing developing nuclei are highly hydrophilic. It is difficult to secure adequate anchorage between the hydrophobic film base and a waterpermeable hydrophilic image-receiving layer, especially because the anchorage must remain secure in the liquid processing step to which the material is subjected.

As described in published EP-A 0 065 329 and corresponding U.S. Pat. No. 4,429,032 a proper anchorage of a DTR-image receiving layer to a corona-discharge treated polyvinyl chloride support has been obtained by the use in the image-receiving layer of colloidal silica in a weight ratio of from 5/1 to 2/1 with respect to a hydrophilic binder such as gelatin. Although such an image-receiving layer shows the desired adherence, its cohesion and resistance to scratching is relatively poor.

It is an object of the present invention to provide an improved DTR-image receiving material wherein a development nuclei containing layer has a good adherence to a hydrophobic polyvinyl chloride support, has low swelling power and yet good image-forming qualities and is capable of yielding practically touch-dry copies immediately after separation from the developed photographic material.

It is further object of the present invention to incorporate the processed DTR-image-receiving material in a laminated article serving as identification document and protected against forgery by strong adherence of the different layers through crosslinking reaction inside the image-receiving layer.

Other objects and advantages of the present invention will appear from the following description.

The present invention provides an image-receiving material suited for silver complex diffusion transfer processing, wherein a polyvinyl chloride resin support is directly coated with an image receiving layer that contains developing nuclei in a binder medium, characterized in that said image-receiving layer comprises in percent by weight on its total weight the following ingredients:

1.3% to 80% of proteinaceous colloid, e.g. gelatin or caseine,

0% to 85% of colloidal silica having preferably an average particle size in the range of 5 to 100 nm, 1.0% to 70% of an ionogenic polyester-polyurethane applied from an aqueous dispersion wherein isocyanate groups still present in its structure have reacted with an ionomeric compound containing at least one active hydrogen atom and a carboxylate or sulphonate salt group, and 0% to 30% of a siloxane having reacted through the siloxane part with the colloidal silica, the dry coverage of the image receiving layer being in the range of 0.2 g to 16 g per m2.

The preparation of anionic polyester-polyurethanes is described in U.S. Pat. No. 3,397,989 and U.S. Pat. No. 4,388,403, wherein specific examples of polyester-polyurethane compounds containing carboxylate or sulphonate groups are mentioned.

According to U.S. Pat. No. 3,397,989 anionic polyurethanes are used as plasticizing agents for gelatin and according to U.S. Pat. No. 4,388,403 said polyurethanes are used for the preparation of aqueous dispersions of "loaded" hydrophobic substances.

For the the preparation of an image-receiving material according to the present invention the quantity of anionic carboxylate or sulphonate salt groups is sufficient to make the polyester-polyurethane dispersable in aqueous medium optionally in the presence of a water-miscible solvent.

Preferably the sulfonate and/or carboxylate groups total about 0.5 to about 15% by weight with respect to the polyester-polyurethane.

The polyester-polyurethane is preferably a polyurethane of an essentially linear polyester compound that has two terminal hydroxyl groups, the polyester having preferably a molecular weight of about 300 to about 20,000.

Preferred anionic polyester-urethanes for use according to the present invention contain linear polyester structural parts corresponding with a polyester of a dicarboxylic acid containing up to 6 carbon atoms and a polyhydric aliphatic alcohol containing up to 6 carbon atoms.

An ionogenic polyester-polyurethane particularly suited for use in combination with gelatin and/or caseine in a hydrophilic waterpermeable layer on polyvinyl chloride supports is applied as an aqueous dispersion (called hereinafter composition A) containing in percentage by weight with respect to the total dispersion composition the reaction product of:

(1) the polyester of adipic acid and hexanediol with average molecular weight 840, (23%), (2) 4,4'-diisocyanato-dicyclohexylmethane (14%), (3) dimethylolpropionic acid (2%), (4) trimethylamine (1.5%), said reaction product being dispersed in water containing 7.5% by weight of N-methylpyrrolidinone, the balance being water.

The amount of proteinaceous colloid, e.g. gelatin or caseine, may vary within wide limits with respect to the anionic polyester-urethane, such in view of the desired degree of waterpermeability and/or hardening possibilities of the coated layer.

The term "polyvinyl chloride" in the present invention includes the homopolymer, as well as any copolymer containing at least 50% by weight of vinyl chloride units and including no hydrophilic recurring units.

Vinyl chloride copolymers serving as the support may contain one or more of the following comonomers: vinylidene chloride, vinyl acetate, acrylonitrile, styrene, butadiene, chloroprene, dichlorobutadiene, vinyl fluoride, vinylidene fluoride and trifluorochloroethylene.

The polyvinyl chloride serving as the support may be chlorinated to contain 60-65% by weight of chlorine.

Many properties of polyvinyl chloride and its copolymers are improved by plasticization and their stability can be improved by stabilizers well known to those skilled in the art (see e.g., F. W. Billmeyer, Textbook of Polymer Chemistry, Interscience Publishers, Inc., New York (1957) p. 311-315)).

The polyvinyl chloride support may contain pigments or dyes as colouring matter e.g. in an amount up to 5% by weight. An opaque white appearance may be obtained by incorporation of white pigments, e.g. titanium dioxide particles.

Colloidal silica suited for use in an image-receiving material according to the present invention is preferably hydrated silica used as a dispersion having a pH in the range of 8 to 9. The collidal silica particles used in the present invention have preferably an average grain diameter between 10 and 100 nm. Such silica particles are available in aqueous colloidal dispersions marketed under the commercial names "LUDOX" (trade name of E. I. du Pont de Nemours, Wilmington, Del. U.S.A., and "SYTON" (trade name of Monsanto Chemical Corporation, Boston, Mass. U.S.A. and "KIESELSOLE" (trade name of Farbenfabriken Bayer AG, Leverkusen, West-Germany. SYTON X-30 is a trade name of Monsanto Chemical Company, St. Louis, Mo., U.S.A. for a 30% by weight aqueous dispersion of silica particles having an average size of 25 nm) and KIESELSOL 300-F (trade name of Farbenfabriken Bayer AG, Leverkusen, West-Germany) comprising a colloidal silica having an average particle size of 7-8 nm.

Representatives of siloxane compounds for use in the image-receiving material according to the present invention are within the scope of the following general formula:

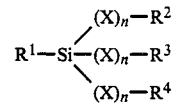

wherein:

$R^1$ represents a chemical group capable of a polymerization reaction or reactive with respect to amino and/or hydroxyl groups present in proteinaceous material such as gelatin and caseine, more particularly is a group containing reactive halogen such as a reactive chlorine atom, an epoxy group or an alpha,beta-ethylenically unsaturated group, representatives of such groups being e.g. the following:

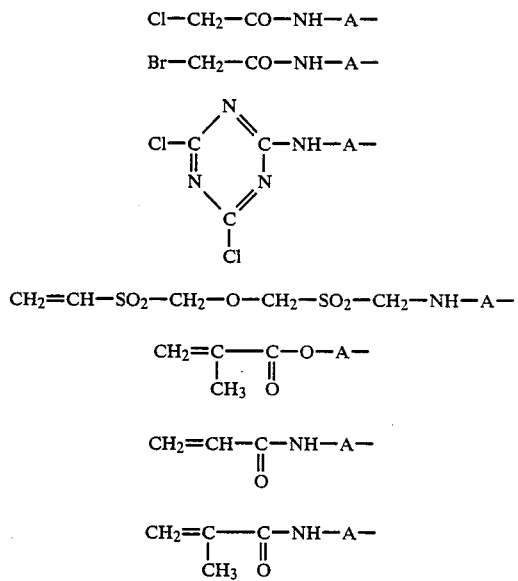

wherein A represents an alkylene group preferably a $C_1$-$C_4$ alkylene group, and

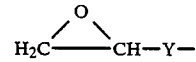

wherein Y is a bivalent hydrocarbon chain including such chain interrupted by oxygen, e.g. is a —CH$_2$—O(CH$_2$)$_3$— group, or a bivalent hydrocarbon group that is linked at the side of the silicon atom to oxygen, e.g. is a —CH$_2$—O— group, X represents oxygen, each of $R^2$, $R^3$ and $R^4$ (same or different) represents a hydrocarbon group including a substituted hydrocarbon group e.g. methyl and ethyl, and n is 1.

Siloxane compounds according to the above general formula are described in U.S. Pat. No. 3,661,584 and GB-P 1,286,467 as compounds improving the adherence of proteinaceous colloid compositions to glass.

Examples of particularly useful siloxane compounds are listed in the following table 1.

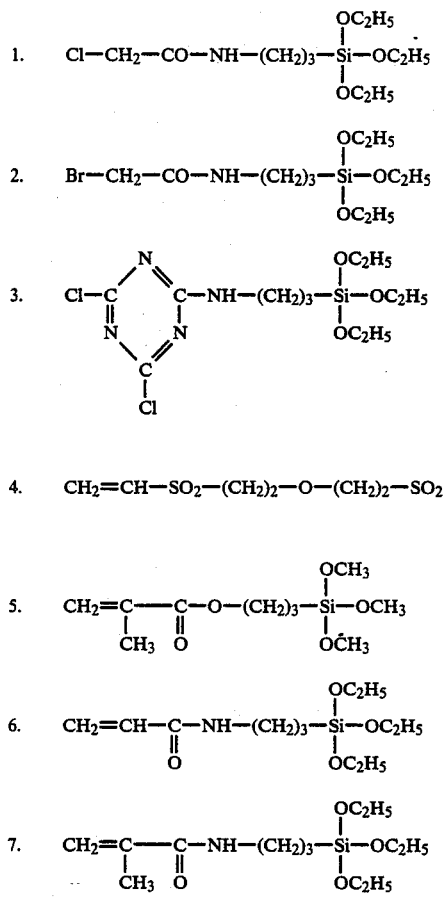

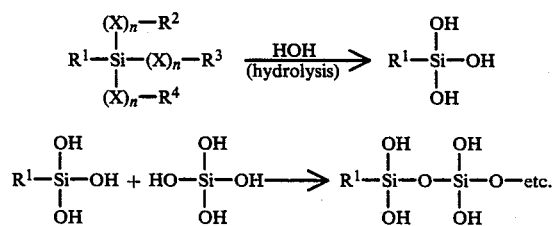

The reaction of the siloxane group with the colloidal silica proceeds very rapidly in aqueous medium through a hydrolysis and dehydration reaction, which actually is a condensation reaction with hydrated silica, i.e. (Si-(OH)$_4$. The R$^1$ group in the siloxane compound is at room temperature (20° C.) preferably not strongly reactive with respect to gelatin so that the coating solution does not obtain a prohibitively high viscosity in the coating stage. Full hardening by crosslinking is preferably carried out at elevated temperature after the image formation, e.g. by heating during a heat-sealing lamination step.

By the siloxane group a macrosiloxane is formed with the colloidal hydrated silica according to the following reaction scheme:

The image-receiving layer composed according to the present invention has a high resistance to abrasion and yields very rapidly a touch dry print by DTR-image formation.

To reduce repellence on coating and improving coating speed the polyvinyl chloride resin support or polyvinyl chloride coated paper support is pre-treated with a corona discharge by passing the support, e.g. in sheet or belt form, between a grounded conductive roller and corona wires whereto an alternating current (AC) voltage is applied with sufficiently high potential to cause ionization of the air. Preferably the applied peak voltage is in the range of 10 to 20 kV. An AC corona unit is preferred because it does not need the use of a costly rectifier unit and the voltage level can be easily adapted with a transformer. In corona-discharge treatment with an an AC corona unit a frequency range from 10 to 100 kHz is particularly useful. The corona treatment can be carried out with material in the form of a belt or band at a speed of 10 to 30 m per min while operating the corona unit with a current in the range of 0.4 to 0.6 A over a belt or band width of 25 cm.

The corona-discharge treatment makes it possible to dispense with a solvent treatment for attacking and roughening the surface of the resin support and is less expensive and more refined in its application.

The development nuclei used in a hydrophilic colloid binder in the silver complex DTR-image-receiving material are of the kind generally known in the art, e.g. are those described in the already mentioned book of André Rott and Edith Weyde, pages 54–56. Particularly suited are colloidal silver and colloidal metal sulphides, e.g. of silver and nickel and mixed sulphides thereof. The image-receiving material may include in the hydrophilic colloid binder any other additive known for use in such materials, e.g. toning agents, a certain amount of silver halide solvent, one or more developing agents, opacifying agents, e.g. pigments, and optical brightening agents.

The image-receiving layer can form part of a separate image-receiving material or form an integral combination with the light-sensitive layer(s) of the photographic material.

When the image-receiving layer is applied to a common support and remains associated with the silver halide emulsion layer(s) after processing of the photosensitive material, an alkali-permeable light-shielding layer, e.g. containing white pigment particles, is applied between the image-receiving layer and the silver halide emulsion layer(s) to mask the negative image with respect to the positive image as described e.g. in the already mentioned book of André Rott and Edith Weyde, page 141.

According to a particular embodiment in an image-receiving material of the present invention the polyvinyl chloride support is provided with an adhesive coating at the side opposite to the DTR-image-receiving layer. The adhesive coating, which may be of the pressure-adhesive type, may be protected by a strippable temporary support, e.g. a strippable temporary support on the basis of siliconized glassine paper as described in Research Disclosure, March 1977, item 15513. Said image-receiving material including an adhesive-backing in this manner is suited e.g. for use in paste-ups, e.g. in the production of lay-outs and for text and drawing corrections, and for use in the production of masks that are obtained by cutting the imaged material following the image contours. The resultant adhesive masks can be used in silk screen printing and airbrush creations wherein the masks shield a base in a desired way for coverage with an ink applied by spraying.

The present image-receiving layer is particularly suited for application in the production of laminated articles comprising a photograph. Thus, it is applied advantageously in the manufacture of a laminated article serving as identification document, also called I.D. card, that contains a black-and-white photograph produced by the silver complex DTR-process and by lamination is sandwiched between a clear protective resin cover sheet and the hereinbefore described polyvinyl chloride resin support or polyvinyl chloride coated paper support.

In view of the widespread use of I.D. cards as security documents, e.g. to establish a person's authorization to conduct certain activities (e.g. driver's licence) or to have access to certain areas or to engage in particular commercial actions, it is important that forgery of the I.D. card by alteration of certain of its data and/or photograph is made impossible.

In the production of a laminated article the above defined image-receiving layer containing an image produced by DTR-processing is preferably laminated to a transparent hydrophic resin cover sheet by a technique known as heat-sealing. The hydrophobic resin cover sheet may be made of polyvinyl chloride but is preferably a resin sheet coated with or consisting of a resin having a lower glass transition temperature (Tg) and melting temperature (Tm) than the resin present in the support sheet. According to a preferred embodiment the cover sheet is a polyethylene terephthalate resin sheet coated with a resinous melt-adhesive layer, e.g. a polyalkylene layer, preferably polyethylene layer, having a glass transition temperature at least 40° C. lower than the glass transition temperature of the resin of the support sheet of the laminar article. In this connection reference is made to the Tg values of polyethylene, polypropylene, polyvinyl chloride and polyethylene terephthalate being −20° C., +5° C., +80° C. and +67° C. respectively (see J. Chem. Educ., Vol. 61, No. 8. August 1984, p. 668).

The lamination of the present image receiving material with a covering hydrophobic resin film sheet material proceeds preferably by heat-sealing between flat steel plates under a pressure of, e.g., 10 to 15 kg/cm2 at a temperature in the range of 120° to 150° C., e.g. at 135° C., or by using other apparatus available on the market for heat-sealing lamination purposes.

According to one embodiment the image-receiving layer is coated onto an opaque polyvinyl chloride support having a thickness of only 0.150 to 0.75 mm. A sheet of that thickness can still be manipulated easily in a mechanical printing process, e.g. offset or intaglio printing, and before or after being coated with the image-receiving layer can receive, additional security marks in the form of e.g. a watermark, finger prints, printed patterns known from bank notes, coded information, e.g. binary code information, signature or other printed personal data that may be applied with fluorescent pigments and/or visibly legible or ultraviolet-legible printing inks as described e.g. in GB-P 1,518,946 and U.S. Pat. No. 4,105,333.

Other possibiities to increase security against counterfeiting are the inclusion in the laminate of infrared-absorbing markings, magnetic dots or strips and electronic microcircuits hidden from visibility, and holograms as described, e.g., in DE-OS 2 639 952, GB-P 1,502,460 and 1,572,442 and U.S. Pat. No. 3,668,795. The holographic patterns may be obtained in silver halide emulsion layers, normally Lippman emulsions, especially designed for that purpose and can either or not be combined with a photograph.

According to an embodiment the silver halide emulsion layer for producing the hologram is applied to one side of the transparent cover sheet used in the manufacture of a laminate according to the present invention and laminated together with the image receiving layer either or not separated therefrom by a transparent resin intersheet made of polyethylene or a resin sheet such as a polyvinyl chloride sheet coated with polyethylene.

When the resin sheet used as support of the laminate has to possess a thickness as required for an identification card to be inserted in a slot of an electronic identification apparatus, several sheets of matted polyvinyl chloride are stacked and laminated so as to reach a final thickness of e.g. 0.075 to 1 mm. The laminar article contains in that case preferably in the polyvinyl chloride support sheet, opacifying titanium dioxide and a suitable plasticizing agent. The support may be provided with an embossed structure.

According to a preferred embodiment the image receiving layer according to the present invention, after forming therein a silver image by silver complex diffusion transfer processing, is treated with a compound serving as hardening agent for its proteinaceous material.

Any hardening agent known to those skilled in the art for hardening gelatin and/or caseine can be used.

Very efficient hardening is obtained with poly-epoxy compounds, particularly a tri-epoxy compound described in DE-OS 2 935 354, especially triglycidyl-triazolidin-3,5-dione.

Other particularly suitable hardening agents are N-methylol compounds, e.g. the N-methylol based hardening agents described in published Japanese patent application (Kokai) 60 170.841, and resins such as melamine-formaldehyde resins still containing such groups.

The hardening agents are applied preferably from an aqueous composition serving as rinsing liquid after effecting silver complex diffusion transfer processing.

The following examples illustrate the present invention without, however, limiting it thereto.

All parts, ratios and percentages are by weight unless otherwise stated.

EXAMPLE 1

An opaque polyvinyl chloride sheet having a thickness of 200 μm was treated with an electrical discharge produced by a corona-discharge apparatus operated under the following conditions:

film-travelling speed: 20 m/min,
electrode spacing to film surface: 2 mm,
corona current: 0.55 A,
AC-voltage difference (peak value): 10 kV,
frequency: 30 kHz.

The corona-treated surface was coated with the following composition to form an image receiving layer for silver complex DTR processing:

| | |
|---|---|
| water | 800 ml |
| 3% aqueous dispersion of colloidal $Ag_2S.NiS$ nuclei | 14 ml |
| 30% aqueous dispersion of colloidal silica (average particle size 0.025 μm, pH:8) | 250 ml |
| 5% solution of siloxane compound no. 7 in ethanol | 50 ml |
| 4% aqueous solution of formaldehyde | 10 ml |
| 13.4% aqueous dispersion of caseine | 200 ml |
| 40% aqueous dispersion of composition A | 100 ml |
| water up to | 1234 ml |

Said composition was applied at a wet coverage of 26 m²/l and dried.

By the common silver complex DTR-processs a black-and-white silver image serving for identification purposes was produced therein.

Onto the imaged and dried image-receiving layer a polyvinyl chloride sheet of 60 μm previously being coated on one side with a polyethylene sheet of 30 μm was laid and laminated with the polyethylene in contact with the image-receiving layer. Flat steel plates were used for pressing the layers together under a pressure of 10 kg/cm2 at a temperature of 135° C.

The image contained in the thus obtained laminate was protected against forgery not only by the good sealing but also by the crosslinking reaction taking place in the image-receiving layer making that layer impermeable to aqueous silver etching liquids.

EXAMPLES 2 to 8

Example 1 was repeated with the difference, however, that in the same molar amount the siloxane compounds 1 to 6 respectively of the Table 1 were used. Analogous results were obtained.

EXAMPLE 9

Several combinations of ingredients applied in image-receiving materials containing a polyvinyl chloride support and covering sheet as described in Example 1 were tested with regard to DTR-image forming properties and capability of firm lamination. The compositions described hereinafter in Table 2 containing development nuclei as described in Example 1 and coated at 26 m2/l proved to offer tamper proof adherence in wet and dry state to said support and covering sheet, particularly when pre-treated before lamination with triglycidyl-triazolidin-3,5-dione serving as gelatin hardening agent.

TABLE 2

| | Percentage with respect to dry image-receiving layer | | | | | | | | | | | | |
|---|---|---|---|---|---|---|---|---|---|---|---|---|---|
| I | 1.10 | 2.30 | 1.50 | 4.50 | 2.40 | 24.0 | 0.8 | 0.3 | 0.5 | 0.8 | 0.5 | 2.0 | 1.3 |
| II | 17.3 | 37.7 | 60.2 | 77.0 | 39.0 | 19.0 | 12.5 | 12.9 | 8.30 | 34.5 | 20.0 | 33.1 | 0 |
| III | 54.0 | 0 | 0 | 0 | 0 | 0 | 39.0 | 48.2 | 78.0 | 42.9 | 75.0 | 0 | 65.3 |
| IV | 26.0 | 56.4 | 36.0 | 11.2 | 59.0 | 58.0 | 46.8 | 38.5 | 12.5 | 20.6 | 1.10 | 49.6 | 31.4 |
| V | 1.70 | 3.80 | 2.30 | 7.50 | 0 | 0 | 1.20 | 0.10 | 0.80 | 1.30 | 3.70 | 15.3 | 2.0 |
| X | 4.74 | 2.20 | 3.40 | 1.10 | 2.10 | 0.20 | 6.60 | 16.0 | 9.90 | 6.0 | 10.3 | 2.50 | 3.90 |

I is gelatin.
II is caseine.
III is the 30% wt dispersion of colloidal silica of Example 1.
IV is composition A of Example 1.
V is applied on the coated layer as a 5% wt solution in ethanol of the siloxane compound 7 of Table 1.
X is the coverage of solids in g/m².

We claim:

1. An image-receiving material suited for silver complex diffusion transfer (DTR) processing, wherein a polyvinyl chloride resin support is directly coated with a DTR-image receiving layer that contains developing nuclei in a binder medium, characterized in that said image-receiving layer comprises in percent by weight on its total weight the following ingredients:
   1.3% to 80% of proteinaceous colloid,
   0% to 85% of colloidal silica,
   1.0% to 70% of an ionogenic polyester-polyurethane applied from an aqueous dispersion wherein isocyanate groups still present in its structure have reacted with an inomeric compound containing at least one active hydrogen atom and a carboxylate or sulphonate salt group, the number of said salt groups being sufficient to render said polyester polyurethane dispersible in an aqueous medium, and 0% to 30% of a siloxane forming a reaction product with the colloidal silica, the dry coverage of the image receiving layer being in the range of 0.2 g to 16 g per m2, said siloxane being present when said silica is present in an amount substantially sufficient to form said reaction product with said silica, said resin support being made of a vinyl chloride homopolymer or copolymer, the copolymer containing at least 50% by weight of vinyl chloride units and being free from hydrophilic recurring units.

2. A material according to claim 1, wherein the proteinaceous colloid is selected from the group of gelatin, caseine and mixtures thereof.

3. A material according to claim 1, wherein the sulfonate and/or carboxylate groups total about 0.5 to about 15% by weight with respect to the polyester-polyurethane.

4. A material according to claim 1, wherein the polyester-polyurethane is a polyurethane of an essentially linear polyester compound that has two terminal hydroxyl groups, the polyester having preferably a molecular weight of about 300 to about 20,000.

5. A material according to claim 1, wherein said polyester-polyurethane contains linear polyester structural parts corresponding with a polyester of a dicarboxylic acid containing up to 6 carbon atoms and a polyhydric aliphatic alcohol containing up to 6 carbon atoms.

6. A material according to claim 1, wherein the ionogenic polyester-polyurethane is applied from an aqueous dispersion containing in percentage by weight with respect to the total dispersion composition the reaction product of:
(1) the polyester of adipic acid and hexanediol with average molecular weight 840, (23%),
(2) 4,4'-diisocyanato-dicyclohexylmethane (14%),
(3) dimethylolpropionic acid (2%),
(4) trimethylamine (1.5%), said reaction product being dispersed in water containing 7.5% by weight of N-methylpyrrolidinone, the balance being water.

7. A material according to claim 1, wherein the siloxane compound is within the scope of the following general formula:

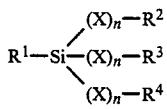

wherein:
R¹ represents one of the following groups:

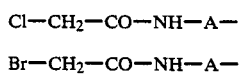

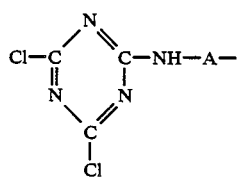

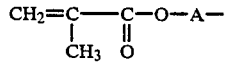

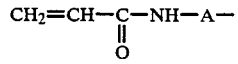

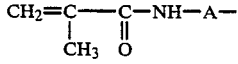

wherein A represents a $C_1$-$C_4$ alkylene group, and

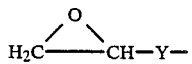

wherein Y is a bivalent hydrocarbon chain including such chain interrupted by oxygen, or a bivalent hydrocarbon group that is linked at the side of the silicon atom to oxygen, X represents oxygen, each of R², R³ and R⁴ (same or different) represent a hydrocarbon group including a substituted hydrocarbon group, and n is 1.

8. An image-receiving material suited for silver complex diffusion transfer (DTR) processing, wherein a polyvinyl chloride resin support is directly coated with a DTR-image receiving layer that contains developing nuclei in a binder medium, characterized in that said image-receiver layer comprises in percent by weight on its total weight the following ingredients:
1.3% to 80% of proteinaceous colloid,
0% to 85% of colloidal silica,
1.0% to 70% of an ionogenic polyester-polyurethane applied from an aqueous dispersion wherein isocyanate groups still present in its structure have reacted with an inomeric compound containing at least one active hydrogen atom and a carboxylate or sulphonate salt group, the number of said salt groups being sufficient to render said polyester polyurethane dispersible in an aqueous medium, and 0% to 30% of a siloxane forming a reaction product with the colloidal silica, the dry coverage of the image receiving layer being in the range of 0.2 g to 16 g per m2, said siloxane being present when said silica is present in an amount substantially sufficient to form said reaction product with said silica, said polyvinyl chloride support being provided with an adhesive coating at the side thereof opposite to the DTR-image-receiving layer, the adhesive coating being protected by a strippable temporary support.

9. An image-receiving material suited for silver complex diffusion transfer (DTR) processing, wherein a polyvinyl chloride resin support is directly coated with a DTR-image receiving layer that contains developing nuclei in a binder medium, characterized in that said image-receiving layer comprises in percent by weight on its total weight the following ingredients:
1.3% to 80% of proteinaceous colloid,
0% to 85% of colloidal silica,
1.0% to 70% of an ionogenic polyester-polyurethane applied from an aqueous dispersion wherein isocyanate groups still present in its structure have reacted with an inomeric compound containing at least one active hydrogen atom and a carboxylate or sulphonate salt group, the number of said salt groups being sufficient to render said polyester polyurethane dispersible in an aqueous medium, and 0% to 30% of a siloxane forming a reaction product with the colloidal silica, the dry coverage of the image receiving layer being in the range of 0.2 g to 16 g per m2, said siloxane being present when said silica is present in an amount substantially sufficient to form said reaction product with said silica, said image receiving layer containing a black-and-white photograph and being incorporated in a laminate sandwiched between a clear protective resin cover sheet and said polyvinyl chloride support.

10. A material according to claim 9, wherein said cover sheet is a polyethylene terephthalate sheet coated with a polyethylene layer.

11. A material according to claim 9, wherein said image receiving layer contains a black-and-white photographic image and before being incorporated into said laminate, the image receiving layer has been treated after the image formation therein with a hardening agent for said proteinaceious colloid therein.

12. A material according to claim 11, wherein the hardening agent is a poly-epoxy compound or compound containing N-methylol groups.

13. A material according to claim 11, wherein the hardening agent is triglycidyl-triazolidin-3,5-dione.

* * * * *